United States Patent [19]
Yetter et al.

[11] Patent Number: 5,689,228
[45] Date of Patent: Nov. 18, 1997

[54] PARALLEL MAGNITUDE COMPARISON USING MANCHESTER CARRY CHAINS

[75] Inventors: Jeffry D. Yetter, Loveland; Paul L. Perez, Fort Collins, both of Colo.

[73] Assignee: Hewlett-Packard Company, Palo Alto, Calif.

[21] Appl. No.: 731,632

[22] Filed: Oct. 15, 1996

[51] Int. Cl.$^6$ ................................................. G06F 7/02
[52] U.S. Cl. ................................................. 340/146.2
[58] Field of Search ..................................... 340/146.2

[56] References Cited

U.S. PATENT DOCUMENTS

| | | | |
|---|---|---|---|
| 5,059,942 | 10/1991 | Burrows | 340/146.2 |
| 5,208,490 | 5/1993 | Yetter | 307/462 |
| 5,341,500 | 8/1994 | Moyer et al. | 340/146.2 |

*Primary Examiner*—Margaret Rose Wambach

[57] ABSTRACT

Disclosed herein are methods and apparatus for performing magnitude comparisons within a shift-merge unit (SMU). A programmable or partially programmable Manchester carry chain is used to perform each comparison. The Manchester carry chains are programmed using the bits of mask markers and are constructed so as to make a comparison with respect to a given mask condition and position marker which are constants. An implementation in dual rail dynamic CMOS logic avoids the necessity of input inversions, and allows construction of more compact Manchester carry chain circuitry. The size of an SMU will therefore be determined by mask marker routings rather than transistor count. When shorted, opened, and/or redundant transistors, and/or transistors programmed with constants are optimized out of constructed Manchester carry chains, the mask marker bits of a dual rail SMU will have equal fanouts, thereby preventing clock skew. Manchester carry chains may be broken into modular components which may be stepped a number of times to create a $2^N$ bit SMU. Breaking carry chains into modular components also allows the creation of a single mask, or several smaller masks, within a single SMU. This is an important factor in handling multimedia data which comprises smaller word lengths than instruction data.

20 Claims, 10 Drawing Sheets

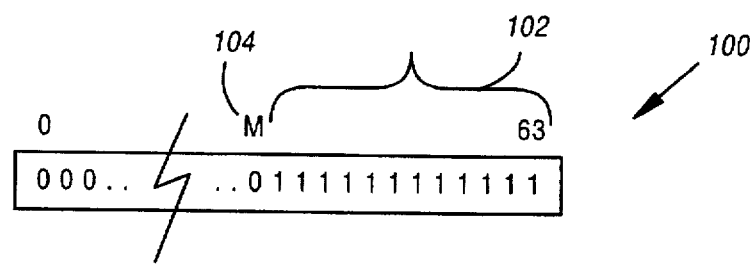
FIG. 1
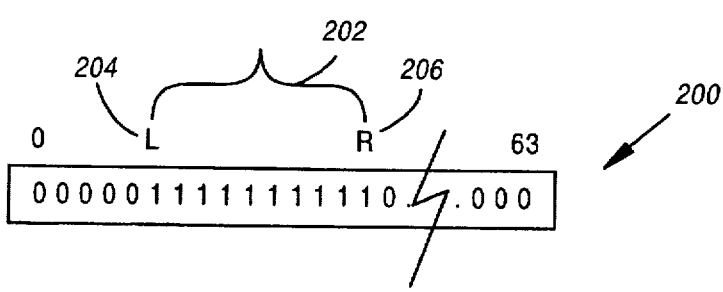
FIG. 2
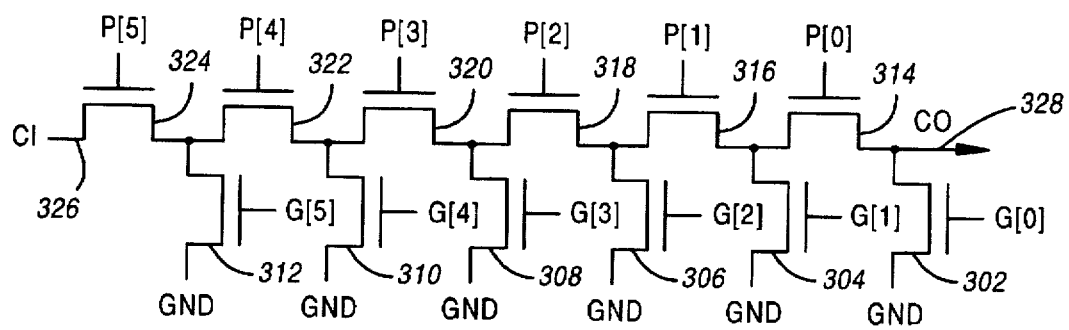
FIG. 3
| I | 5 | 4 | 3 | 2 | 1 | 0 |
|---|---|---|---|---|---|---|
| C[I] | 0 | 1 | 0 | 0 | 1 | 0 |
| M[I] | 1 | 0 | 0 | 1 | 0 | 0 |
FIG. 4

| C[I] | G[I] | P[I] |
|---|---|---|
| 0 | M[I] | 1 |
| 1 | 0 | M[I] |

| C[I] | G[I] | P[I] |
|---|---|---|
| 0 | 0 | ~M[I] |
| 1 | ~M[I] | 1 |

FIG. 6

| C[I] | G[I] | P[I]* |
|---|---|---|
| 0 | M[I] | 1 |
| 1 | 0 | M[I] |

| C[I] | G[I] | P[I]* |
|---|---|---|
| 0 | 0 | ~M[I] |
| 1 | ~M[I] | 1 |

FIG. 8

| I | 5 | 4 | 3 | 2 | 1 | 0 |
|---|---|---|---|---|---|---|
| C23[I] | 1 | 1 | 1 | 0 | 1 | 0 |
| P23[I] | M[5] | M[4] | M[3] | 1 | M[1] | 1 |
| G23[I] | 0 | 0 | 0 | M[2] | 0 | M[0] |

FIG. 9

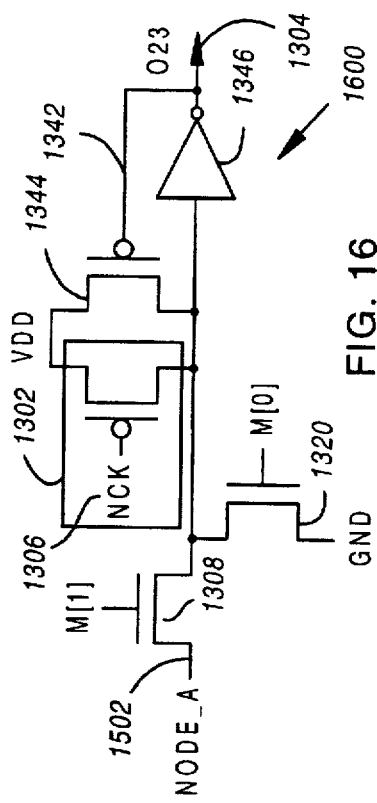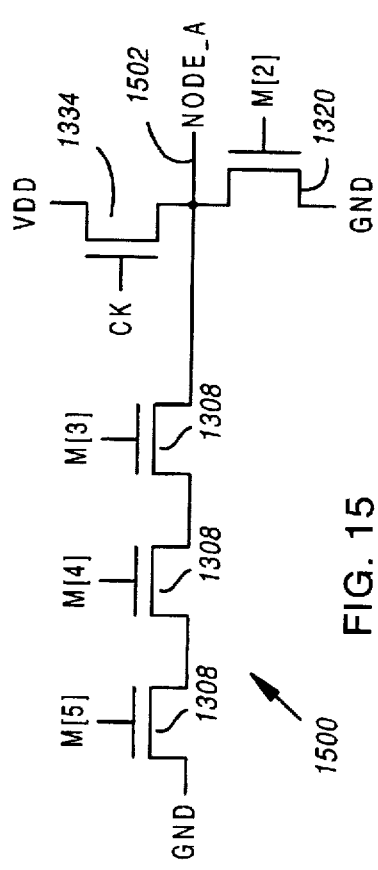

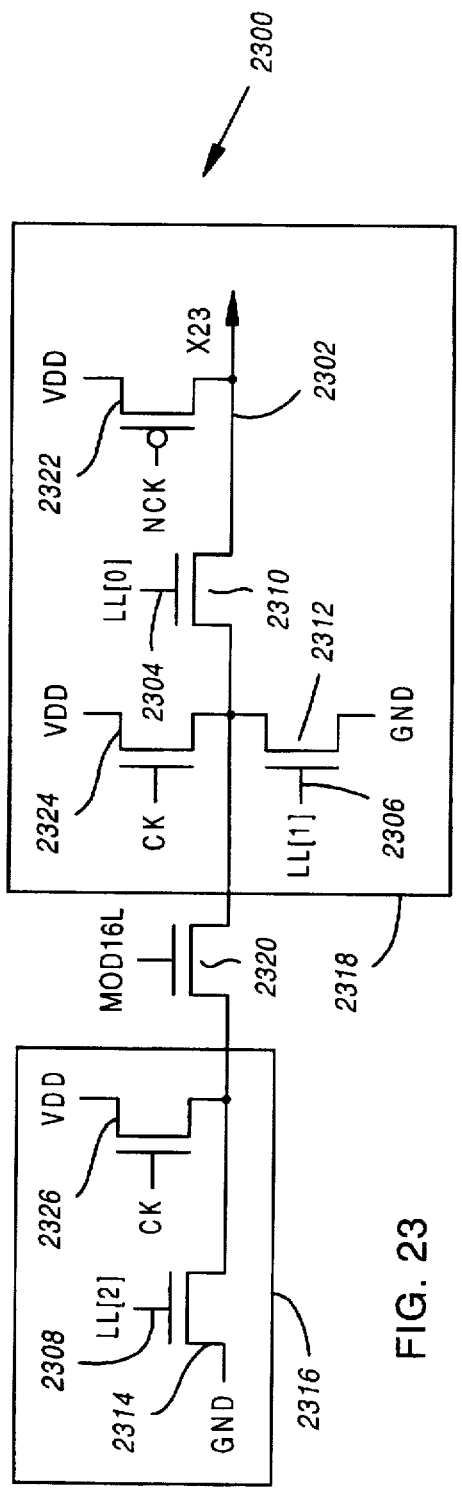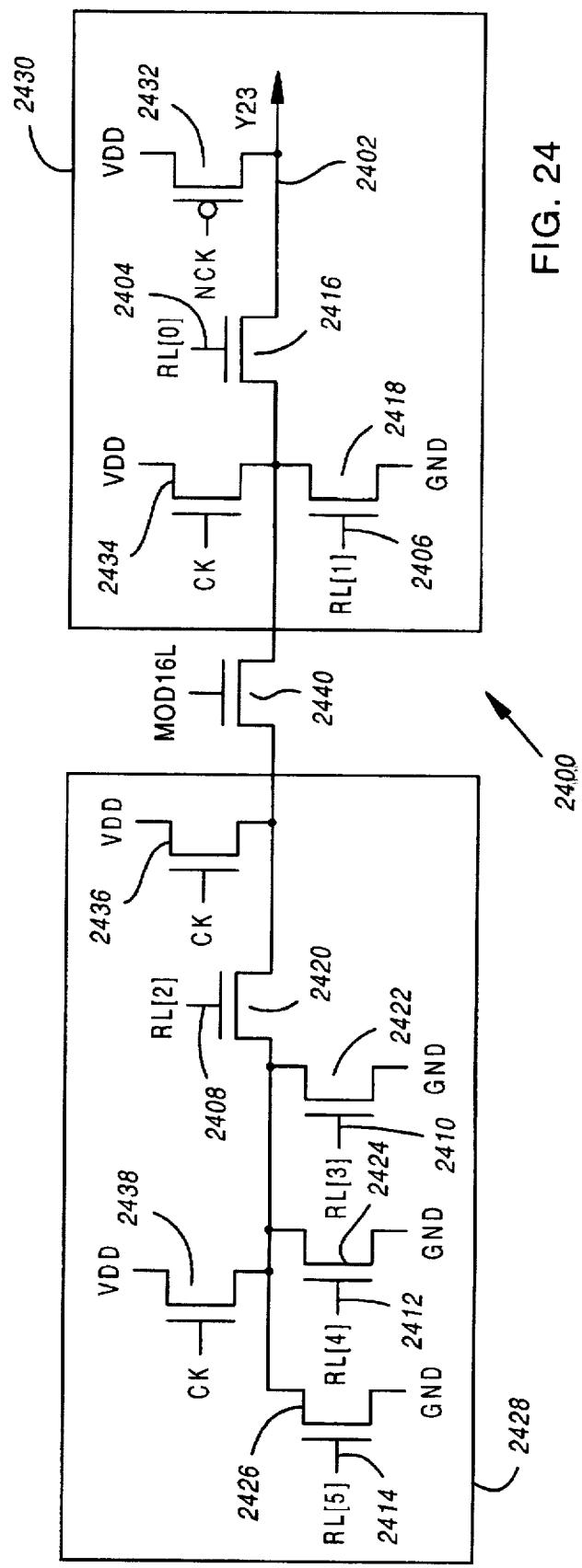
FIG. 23
FIG. 24

FIG. 29
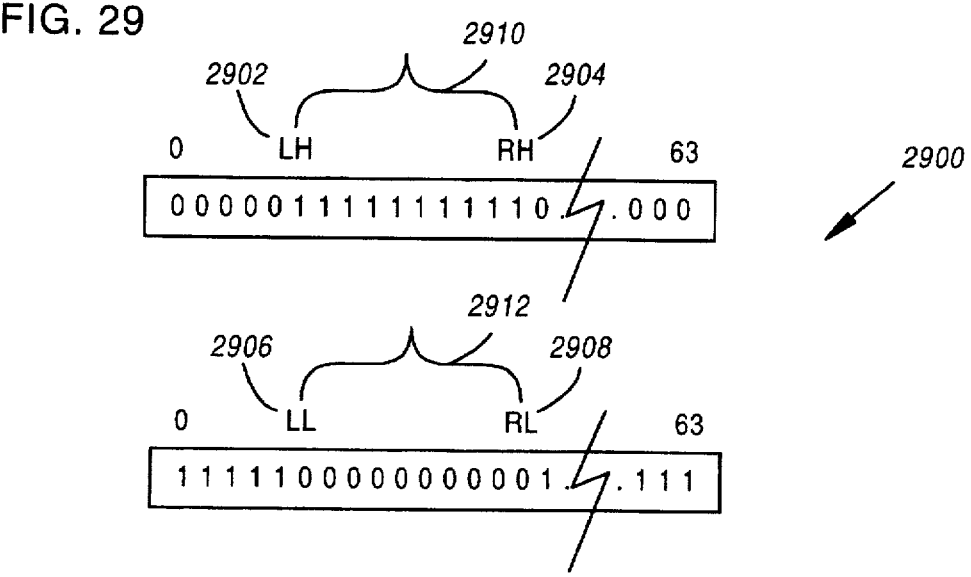
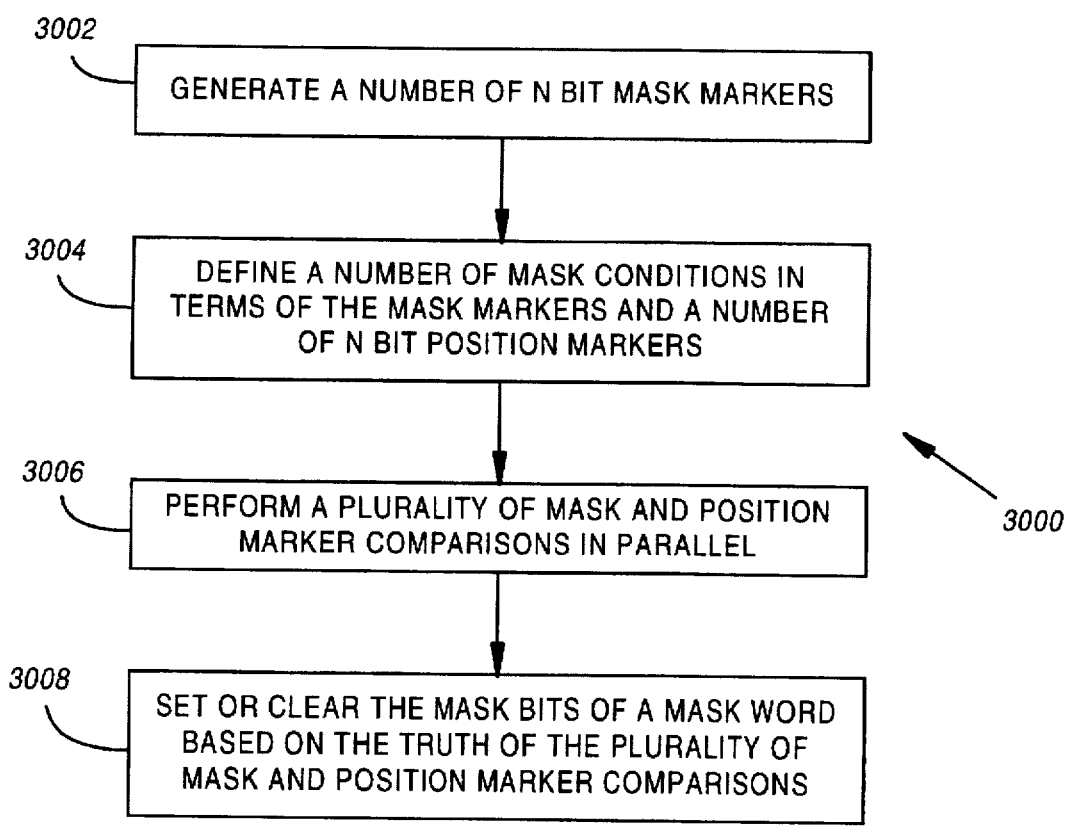
FIG. 30

PARALLEL MAGNITUDE COMPARISON USING MANCHESTER CARRY CHAINS

BACKGROUND OF THE INVENTION

The invention pertains to the generation of masks during execution of a shift-merge instruction. More particularly, the invention pertains to the use of static, dynamic, or differential dynamic logic in performing magnitude comparisons during mask generation in wide-word, high-frequency, RISC (reduced instruction set computer) VLSI (very large scale integrated) processors.

Most RISC processors comprise a shift-merge unit (SMU) for implementing shift-merge instructions. As part of its instruction execution, the SMU must generate a mask word. The mask word comprises a bit corresponding to each bit of a result word. For any given result bit, a "set" mask bit (e.g., a logic high) indicates that the result bit must come from an operand shifted by an arbitrary amount. A "cleared" bit (e.g., a logic low) indicates that the result bit can come from other sources.

A mask bit is typically generated in response to either a single mask marker, or two inclusive mask markers (i.e., a left mask marker, L, and a right mask marker, R). The markers are set by an SMU and indicate a range of bits to be set. In setting the bits of a mask word, mask generation circuitry must perform up to four magnitude comparisons in parallel. These comparisons are performed for each bit of a mask word. For example, the magnitude comparisons performed with respect to each mask bit of a dual rail dynamic CMOS (complementary metal-oxide semiconductor) mask word may comprise:

```
IF (C≥LH)
AND (C≤RH),
    THEN COH is set; and
IF (C<LL)
OR (C>RL),
    THEN COL is cleared,
``` where C is the position of mask bit CO, and H and L denote the high and low rail components of a dual rail variable. The equations also presume a mask word of N consecutively numbered bits, wherein the mask word's most significant bit is its $0^{th}$ bit, and its least significant bit is its $(N-1)^{th}$ bit.

Conventional SMUs have performed magnitude comparisons using chains of static carry/borrow stages. In short, a first magnitude comparison is completed with respect to the mask markers and a most significant bit position of the mask word. This first magnitude comparison is accomplished, in part, by a first carry/borrow stage. The carry out of the first carry/borrow stage is then input into a carry/borrow stage corresponding to a magnitude comparison between the mask markers and an immediate less significant bit position of the mask word. A second magnitude comparison is then completed within this stage. One can readily appreciate that an approximate sixty-four gate delay is required in completing all of the magnitude comparisons necessary to the operation of a sixty-four bit SMU. This delay has always been a hindrance to SMU operation, but has become a severe impediment in constructing SMUs operating at speeds above 120 MHZ. In addition to being slow, carry/borrow based magnitude comparators are area intensive (i.e., require increased die surface area), and are easily susceptible to noise.

The delays required of carry/borrow magnitude comparators have been reduced to a certain degree by implementing carry look ahead and/or carry select techniques within the carry chain. However, delays in performing a plurality of magnitude comparisons are still at unacceptable level. These delays are especially noticeable with respect to magnitude comparisons performed on wide-word operands in high-speed RISC VLSI processors.

It is therefore a primary object of this invention to provide a magnitude comparison circuit which can perform comparisons more speedily (i.e., in a fewer number of gate delays).

It is a further object of this invention to provide a magnitude comparison circuit which may be readily implemented in dynamic CMOS logic and/or dual rail dynamic CMOS logic.

It is an additional object of this invention to provide a magnitude comparison circuit having an implementation which requires less die surface area on an IC wafer.

It is yet another object of this invention to provide a magnitude comparison circuit which is immune to noise.

It is also an object of this invention to provide a magnitude comparison circuit which is modular in design.

Finally, it is an object of this invention to provide a magnitude comparison circuit which is suitable for use in wide-word, high-frequency RISC VLSI processors.

SUMMARY OF THE INVENTION

In the achievement of the foregoing objects, the inventors have devised magnitude comparison circuitry which performs a plurality of magnitude comparisons in an independent and parallel fashion. The circuitry comprises a plurality of Manchester carry chains having inputs coupled to monotonic (i.e., low to high) mask marker bits (either from a single mask marker, or differential left and right mask markers).

Each Manchester carry chain may be programmed to compare a variable mask marker with a constant position marker. The mask condition dictating the type of comparison is also a constant.

The disclosed circuitry has been used to generate a sixty-four bit mask in under 800 pS.

The circuitry is compact. In addition to an approximate 40% reduction in FET (field effect transistor) count, the dynamic implementation of the disclosed circuitry uses a substantially greater number of smaller n-channel FETS. Smaller FETS help to minimize mask marker loading.

The circuitry is highly immune to noise. Since dynamic gates must be armed (precharged), a logic stage will recognize only one valid input. A next valid input will not be recognized until the stage is reset (rearmed).

Since a Manchester carry chain can be broken into small regular groups of transistors, each small group can be laid out once, and then stepped N times for an N-bit word. This feature not only minimizes construction effort, but also provides for the easy handling of multimedia data and mask words.

The dual rail dynamic version of the disclosed circuitry is designed to tolerate late inputs. Since control lines associated with the circuitry are monotonic, and the speed of evaluation logic is very fast, logic inputs may be received up until the very end of an evaluation period. Logic outputs can be produced as the evaluation logic is beginning its precharge period.

Finally, the circuitry is immune to duty-cycles. Since the evaluation logic can tolerate late inputs, and produce a valid monotonic output, a mask can be used to compute a result even after the evaluation period has passed. This makes the circuitry immune to duty cycle variation attributable to clock skew, edge degradation and the like.

These and other important advantages and objectives of the present invention will be further explained in, or will become apparent from, the accompanying description drawings and claims.

BRIEF DESCRIPTION OF THE DRAWINGS

An illustrative and presently preferred embodiment of the invention is illustrated in the drawings in which:

FIG. 1 illustrates a single ended mask field defined by mask marker M and mask condition M<C;

FIG. 2 illustrates a dual ended mask field defined by mask markers L and R and mask conditions L≦C≦R.

FIG. 3 is a schematic illustrating a generic Manchester carry chain comprising generate and propagate transistor stages;

FIG. 4 is a table comparing corresponding bits of position marker C[I] and mask marker M[I];

FIG. 5 is a table illustrating generate and propagate transistor programming for the mask condition C≦M;

FIG. 6 is a table illustrating generate and propagate transistor programing for the mask condition C≧M;

FIG. 7 is a table illustrating generate and propagate transistor programing for the mask condition C<M;

FIG. 8 is a table illustrating generate and propagate transistor programing for the mask condition C>M;

FIG. 9 is a table illustrating Manchester carry chain input values for performing the comparison C23≦M;

FIGS. 15 & 16 are schematics illustrating a bifurcated version of the FIG. 14 Manchester carry chain;

FIG. 17 is a table illustrating generate and propagate transistor programming for the dual rail mask condition C≦RH;

FIG. 18 is a table illustrating generate and propagate transistor programming for the dual rail mask condition LH≦C;

FIG. 19 is a table illustrating generate and propagate transistor programming for the dual rail mask condition LL>C;

FIG. 20 is a table illustrating generate and propagate transistor programming for the dual rail mask condition C>RL;

FIG. 23 is a schematic illustrating a Manchester carry chain programmed according to the FIG. 18 table;

FIG. 24 is a schematic illustrating a Manchester carry chain programmed according to the FIG. 19 table;

FIG. 29 illustrates a dual rail, dual ended mask field defined by dual rail mask markers and complementary mask conditions; and FIG. 30 is a flow chart illustrating the general steps involved in creating the circuits of FIGS. 10, 11, 13–16, and 22–25.

DESCRIPTION OF THE PREFERRED EMBODIMENT

Figure 10:
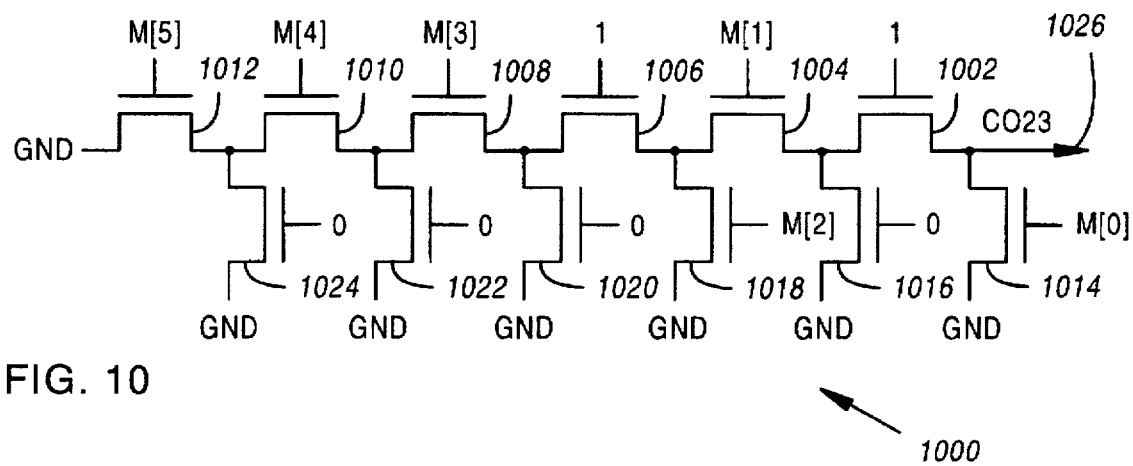
FIG. 10 is a schematic illustrating a Manchester carry chain programmed to perform the comparison C23≦M.
Figure 11:
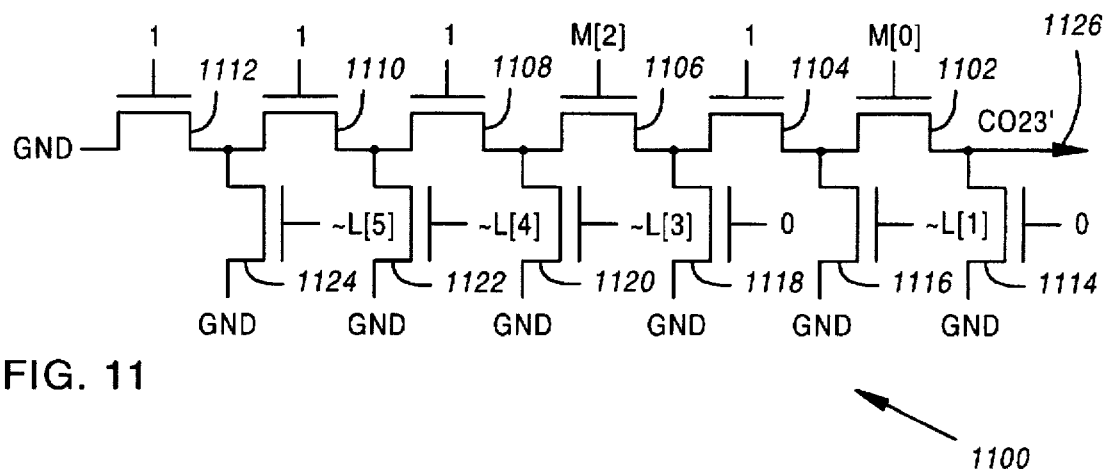
FIG. 11 is a schematic illustrating a Manchester carry chain programmed to perform the comparison L≦C23.
Figure 12:
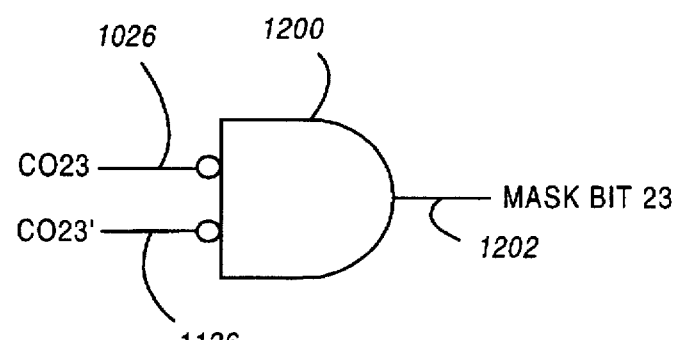
FIG. 12 is a schematic illustrating a circuit for generating a single dual ended mask bit.

Methods and apparatus for performing magnitude comparisons within a shift-merge unit (SMU) are shown generally in FIGS. 5–28, & 30. Consistent with these methods and apparatus, a method 3000 (FIG. 30) of generating a mask word 100, 200, 2900 (FIGS. 1, 2 & 29) of up to $2^N$ mask bits, wherein each mask bit is referenced by a position marker 402 (FIG. 4) of N bits, may generally comprise the steps of generating 3002 a number of mask markers 104, 204, 206, 404, 2902–2908 and defining 3004 a number of mask conditions. In parallel, each of the number of mask markers 104, 204, 206, 404, 2902–2908 may be compared 3006 to each of the position markers 402. A comparison between a particular mask marker 404 and position marker 402 determines whether a particular mask condition is true with respect to the particular mask marker 404 and position marker 402. Based on the truth of the plurality of mask marker 104, 204, 206, 404, 2902–2908 and position marker 402 comparisons, mask bits of a mask word 100, 200, 2900 may be set or cleared 3008.

Apparatus (FIGS. 10–16 & 21–28) for carrying out the above method 3000 may generally comprise a plurality of Manchester carry chains (FIGS. 10, 11, 13–16, 21–25) coupled so as to substantially simultaneously effect the comparison of a number of N bit mask markers 104, 204, 206, 404, 2902–2908 (FIGS. 1, 2, 4 & 29) with up to $2^N$ N bit position markers 402, thereby generating a mask word 100, 200, 2900 of up to $2^N$ mask bits. As used in this description, "substantially simultaneously effect" means simultaneously within the confines of an ideal model, and as close to simultaneously as may be achieved within a physical implementation of a circuit.

Apparatus for generating a mask word 2900, 100, 200 of up to $2^N$ mask bits may also generally comprise a plurality of Manchester carry chains 2200, 2300, 2400, 2500 (FIGS. 22–25) having outputs 2302, 2402, 2502, 2602 coupled to mask bit generation circuitry 2600, 2700, 2800. Each Manchester carry chain 2200, 2300, 2400, 2500 may further comprise inputs 2204–2214, 2304–2308, 2404–2414, 2504–2508 driven by the bits of one of a number of mask markers 2902–2908 (FIG. 29), and a chain of generate and propagate transistors 2216–2226, 2310–2314, 2416–2426, 2510–2514 configured to perform a comparison between a particular mask marker 2902–2908, 404 and position marker 402 (FIG. 4). The output of a Manchester carry chain 2200, 2300, 2400, 2500 will therefore be indicative of a mask condition's truth with respect to a particular mask marker 2902–2908, 404 and position marker 402.

Having thus described a method 3000 and apparatus (FIGS. 10–16, 21–28) for performing magnitude compari- sons within an SMU in general, the method 3000 and apparatus will now be described in further detail.

The objective of mask generation logic is to generate a field of "1"s 102, 202, 2910 in a string of "0"s comprising a mask word 100, 200, 2900 of up to $2^N$ bits (or alternatively, a field of "0"s 2912 in a string of "1"s). Each bit of the mask word 100, 200, 2900 is referenced by an N bit position marker, C 402, and the field 102, 202, 2910, 2912 (hereinafter referred to as a "mask field") is defined by 1) one or more mask conditions, and 2) one or more N bit mask markers 404.

A mask condition defines the relationship which must exist between a particular mask marker 404 and position marker 402 if the position marker 402 is to possibly reference a bit falling within the mask field 102, 202, 2910, 2912. With a generic mask marker, M 404, and a generic position marker, C 402, a mask condition may be defined in terms of M and C as:

$$M \geq C, M > C, M = C, M < C, \text{ or } M \leq C.$$

A mask field 102, 202 may be single or dual ended. A single ended mask field 102 is one that can be defined in terms of a single mask marker 104 and mask condition. FIG. 1 shows a single ended mask field 102 defined by mask marker M 104 and mask condition M<C. [Note that the FIG. 1 mask word's most significant bit is its $0^{th}$ bit, and its least significant bit is its $(2^N-1)^{th}$ or $63^{rd}$ bit. For the remainder of this description, references will be made to mask words 100, 200, 2900 of this particular orientation and length. However, the teachings disclosed herein are equally applicable to mask words of all lengths and orientations.]

A dual ended mask field 202 is one that must be defined in terms of left 204 and right 206 mask markers and left and right mask conditions. FIG. 2 shows a dual ended mask field 202 defined by left marker L 204, right marker R 206, left mask condition $C \geq L$, and right mask condition $C \leq R$. The dual ended mask field 202 of FIG. 2 therefore comprises those position markers satisfying the expression $L \leq C \leq R$.

The selection 3004 (FIG. 30) of mask conditions and generation 3002 of mask markers 104, 204, 206, 404, 2902–2908 is beyond the scope of this description and is presumed to be well understood by those skilled in the art. However, given that a plurality of mask conditions and mask markers 104, 204, 206, 404, 2902–2908 exist, each of the mask markers 404 must be compared with the position markers 402 of a mask word to determine the truth of the mask conditions with respect to particular combinations of mask 404 and position 402 markers (i.e., a plurality of magnitude comparisons must be performed). See FIG. 4. In the past, this process has been performed in a sequential fashion using chains of carry/borrow adder stages or the like. Alternatively, magnitude comparisons may be performed in parallel using a plurality of Manchester carry chains 300. A Manchester carry chain 300 is shown generally in FIG. 3. The chain 300 comprises a string of generate/propagate transistor stages 302/314, 304/316, 306/318, 308/320, 310/322, 312/324 coupled between a carry input, CI 326, and a carry output, CO 328. Each generate/propagate stage comprises transistors 302–324 driven by corresponding generate and propagate terms (e.g., transistors driven by inputs G[3] and P[3]).

As will be more fully described below, when used to perform magnitude comparisons, the transistors 302–324 of a carry chain 300 provide a number of conditional logic paths which are capable of setting the carry chain's output 328 (i.e., pulling the output 328 from a logic "0" to logic "1"). When a carry chain 300 is used in this manner, there is no "carry-in" per se to propagate. As a result, all carry inputs 326 to the Manchester carry chains 300 described herein will be shown grounded (i.e., presumed zero).

In a logical comparison of two N bit binary quantities, corresponding bits of the quantities may be compared, beginning with their most significant bits, until the truth or falsity of a condition can be conclusively determined. For example, refer to the mask marker, M 404, and position marker, C 402, of FIG. 4. If the mask condition is $C \leq M$, then a comparison 3006 of C and M begins with a comparison of bits C[0] and M[0]. If C[0]<M[0], it can be conclusively determined that $C \leq M$. If C[0]>M[0], it can be conclusively determined that C>M. However, if C[0]=M[0], then C[1] and M[1] must be compared. The comparison of corresponding bits of C and M continues with the comparison of less and less significant bit pairs, until at some point, the relationship between C and M can be conclusively determined. This comparison process can be simulated by a Manchester carry chain 300 of N generate/propagate stages. The stage 302/314 connected to the chain's carry output 328 is the stage corresponding to the comparison of a mask 404 and position 402 marker's most significant bits. Stages of the carry chain 300 extending away from the chain's carry output 328 correspond to increasingly less significant bit comparisons. To indicate that a bit comparison at stage I may conclusively determine the truth of a relationship between C and M, the generate transistor of stage I must be driven. To indicate that a bit comparison at stage I may conclusively determine the falsity of a relationship between C and M, neither transistor of stage I can be driven. To indicate that a bit comparison at stage I is either inconclusive or results in equivalence (i.e., C[I]=M[I]), the propagate transistor of stage I must be driven.

In order to easily select and drive the appropriate transistors 302–324 of a Manchester carry chain 300 being used as a magnitude comparator, generate and propagate equations must be derived for the two variables being compared (e.g., C 402 and M 404).

Assume the relationship $C \leq M$. The generate equation (i.e., unequivocal truth equation) for this comparison relies on some C[I] being less than a corresponding M[I]. This can only occur when C[I]=0 and M[I]=1. The generate equation for $C \leq M$ is therefore:

$$G[I] = M[I] \cdot \sim C[I],$$

where "·" indicates an ANDing function, and "~" indicates the inverse of a subsequent quantity. The corresponding propagate equation relies on all of C[I] being equal to corresponding M[I]. The appropriate propagate equation is therefore:

$$P[I] = M[I] \cdot C[I] + \sim M[I] \cdot \sim C[I],$$

where "+" indicates an ORing function. Unfortunately, the propagate equation is significantly more complex to implement in CMOS (complementary metal-oxide semiconductor) logic than is the generate equation. However, this problem can be circumvented by factoring additional "don't care" terms into the propagate equation. If a carry output 328 is generated from within a carry chain stage, then it matters not whether control over a magnitude comparison is passed on to a less significant stage. The generate equation for $C \leq M$ may therefore be incorporated into the propagate equation for $C \leq M$. If this is done twice, the following chain of simplifications may be made:

$$P[I] = M[I] \cdot C[I] + {\sim}M[I] \cdot {\sim}C[I] + M[I] \cdot {\sim}C[I] +$$
$$M[I] \cdot {\sim}C[I]$$
$$= (M[I] \cdot C[I] + M[I] \cdot {\sim}C[I]) + ({\sim}M[I] \cdot {\sim}C[I] +$$
$$M[I] \cdot {\sim}C[I])$$
$$= M[I] \cdot (C[I] + {\sim}C[I]) + {\sim}C[I] \cdot ({\sim}M[I] + M[I])$$
$$= M[I] + {\sim}C[I].$$

Alternatively, the above derivation could have been obtained by factoring only a single instance of the C≦M generate equation into the C≦M propagate equation (the alternate derivation is not shown). Given that C[I] is always a constant logic "0" or logic "1", the table 500 of FIG. 5 may be constructed.

Having constructed the table 500 of FIG. 5, the generate 302–312 and propagate 314–324 transistors of a plurality of Manchester carry chains 300 may be programmed to compare C and M to determine whether the condition C≦M is true. For example, consider position marker C23 referencing the twenty-third bit of a sixty-four bit mask word (i.e., N=6). For each bit of C23, C23[I], the appropriate propagate and generate transistor inputs, P23[I] and G23[I], for programming a magnitude comparing Manchester carry chain 1000 (FIG. 10) are shown in FIG. 9. In FIG. 10, these same inputs are shown driving the propagate 1002–1012 and generate 1014–1024 transistors of a Manchester carry chain 1000. Additional Manchester carry chains 300 could be laid out in a similar manner to determine whether C≦M was true with respect to each bit position of a mask word 100. In a simple static CMOS environment, sixty-four Manchester carry chains 300 could therefore be programmed to perform magnitude comparisons 3006 in parallel and output 3008 a single ended mask word 100 comprising bits CO0–CO63.

In a similar fashion, a dual ended mask word 200 can be generated 3008 in static CMOS using twice as many programmable Manchester carry chains 300 configured to function in parallel. However, generation of a dual ended mask 200 requires the derivation of generate and propagate equations for additional mask conditions.

The generate and propagate equations corresponding to C≧M are:

$$G[I] = C[I] \cdot {\sim}M[I]; \text{ and}$$
$$P[I] = C[I] \cdot M[I] + {\sim}C[I] \cdot {\sim}M[I]$$
$$= C[I] \cdot M[I] + {\sim}C[I] \cdot {\sim}M[I] + C[I] \cdot {\sim}M[I] +$$
$$C[I] \cdot {\sim}M[I]$$
$$= (C[I] \cdot M[I] + C[I] \cdot {\sim}M[I]) + ({\sim}C[I] \cdot {\sim}M[I] +$$
$$C[I] \cdot {\sim}M[I])$$
$$= C[I] \cdot (M[I] + {\sim}M[I]) + {\sim}M[I] \cdot ({\sim}C[I] + C[I])$$
$$= C[I] + {\sim}M[I].$$

These equations are alternatively embodied in the table 600 of FIG. 6.

Equations for C<M are:

$$G[I] = M[I] \cdot {\sim}C[I]; \text{ and}$$
$$P[I] = C[I] \cdot M[I] + {\sim}C[I] \cdot {\sim}M[I]$$
$$= C[I] \cdot M[I] + {\sim}C[I] \cdot {\sim}M[I] + C[I] \cdot {\sim}M[I] +$$
$$C[I] \cdot {\sim}M[I]$$
$$= (C[I] \cdot M[I] + C[I] \cdot {\sim}M[I]) + ({\sim}C[I] \cdot {\sim}M[I] +$$
$$C[I] \cdot {\sim}M[I])$$
$$= C[I] \cdot (M[I] + {\sim}M[I]) + {\sim}M[I] \cdot ({\sim}C[I] + C[I])$$
$$= C[I] + {\sim}M[I].$$

The table 700 of FIG. 7 corresponds to the above equations. However, since equivalence of C and M does not factor into the mask condition C<M, the least significant propagate term (i.e., P[5] in the example) must always be equal to zero, thereby preventing the propagation of a voltage from CI 326 to CO 328 (FIG. 3). [Note the recognition of this fact by the "*" appearing in FIG. 8.]

Equations for C>M are:

$$G[I] = C[I] \cdot {\sim}M[I]; \text{ and}$$
$$P[I] = C[I] \cdot M[I] + {\sim}C[I] \cdot {\sim}M[I]$$
$$= C[I] \cdot M[I] + {\sim}C[I] \cdot {\sim}M[I] + C[I] \cdot {\sim}M[I] +$$
$$C[I] \cdot {\sim}M[I]$$
$$= (C[I] \cdot M[I] + C[I] \cdot {\sim}M[I]) + ({\sim}C[I] \cdot {\sim}M[I] +$$
$$C[I] \cdot {\sim}M[I])$$
$$= C[I] \cdot (M[I] + {\sim}M[I]) + {\sim}M[I] \cdot ({\sim}C[I] + C[I])$$
$$= C[I] + {\sim}M[I].$$

Again, P[5] must always be set to zero. This is reflected by the "*" appearing in the FIG. 8 table 800.

Given the above generate and propagate equations for various mask conditions, a dual ended mask 200 may now be generated 3008. Assume the dual ended mask L≦C≦R. If the mask condition C≦R is again applied to position marker C23 (i.e., the position marker 402 referencing the twenty-third bit of a sixty-four bit mask word 200), then the Manchester carry chain 1000 of FIG. 10 can be constructed with inputs R[I] substituted for inputs M[I]. The Manchester carry chain 1100 of FIG. 11 (comprising propagate and generate transistors 1102–1124) is similarly programmed to evaluate L≦C23. The outputs 1026, 1126 of two corresponding Manchester carry chains 1000, 1100 (i.e., outputs CO23 and CO23') may be logically ANDed 1200 to derive a single bit 1202 of a dual ended mask 200. See FIG. 12.

Up to now, the discussion of Manchester carry chains used as magnitude comparators has been with respect to static CMOS logic. Unfortunately, static CMOS circuits require a settling period for outputs to stabilize, and therefore require a certain amount of built-in delay. The advantages of using Manchester carry chains 300 as magnitude comparators are even better appreciated within the context of a dynamic CMOS environment. An exemplary dynamic CMOS Manchester carry chain 1300 modeled after the static CMOS carry chain 1000 of FIG. 10 is pictured in FIG. 13. Note the presence of a precharge circuit 1302 which holds the chain's carry output 1304 low until 1) the precharger 1302 is disabled by an appropriate clock signal, NCK 1306, and 2) inputs to the carry chain 1300 drive a number of series connected transistors 1308–1330 connected between the chain's carry output 1304 and ground, thereby pulling the chain's carry output 1304 high (and either asserting or contributing to the assertion of a mask bit). The particular Manchester carry chain 1300 illustrated in FIG. 13 also comprises an inverting buffer mechanism 1346 and an output feedback path 1342. The feedback path 1342 drives a transistor 1344 which assists in stabilizing the carry output, CO23 1304 (i.e., assists in maintaining the output node 1304 against leakage and noise). A Manchester carry chain 1300 implemented in dynamic CMOS logic not only provides for a faster resolution of magnitude comparisons 3006, but also allows NFETS 1308-1330 (n-channel field effect transistors) comprising the carry chain 1300 to be reduced in size. A reduction in NFET size translates into less power consumption, less capacitance, and more compact circuitry layouts (i.e., circuits requiring less die surface area).

Whether a Manchester carry chain is implemented in static or dynamic logic, a number of techniques can be used to optimize the FET construction of a carry chain 1300. The following optimization techniques help to 1) reduce the effects of parasitic capacitance, 2) reduce the size of carry chains 1300, and 3) increase the speed at which magnitude comparisons may be performed.

Figure 13:
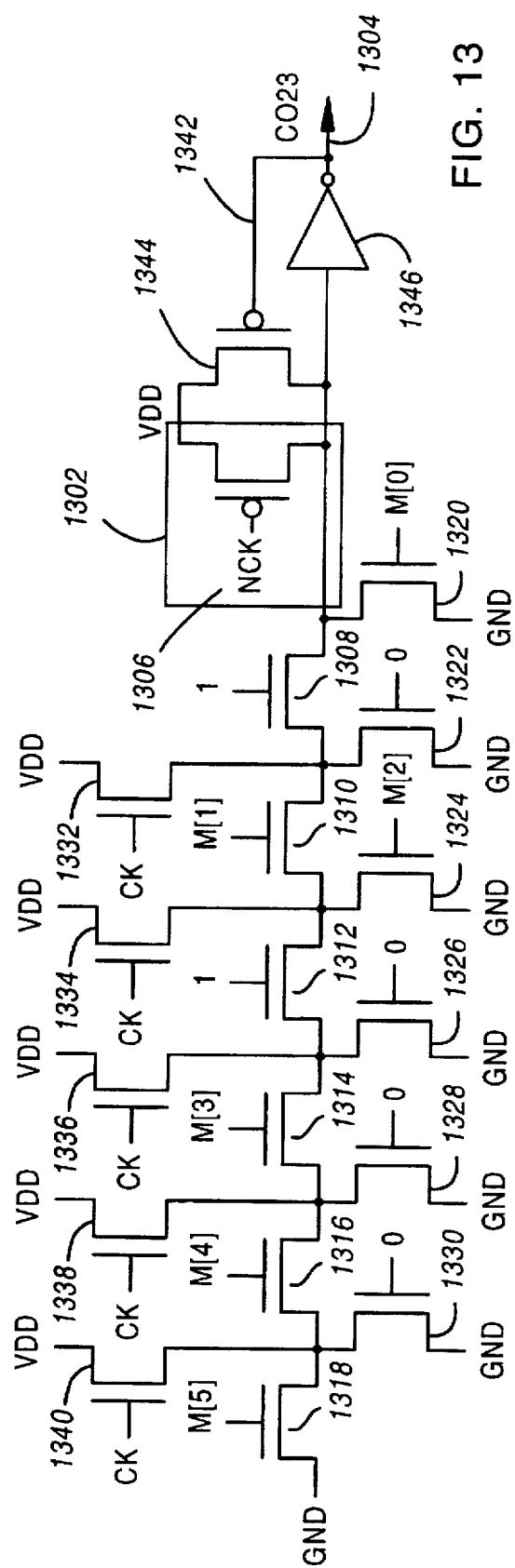
FIG. 13 is a schematic illustrating the Manchester carry chain of FIG. 10 implemented in dynamic CMOS logic.

First, any generate transistor 1322, 1326-1330 programmed with an input of "0" can be eliminated (or merely open circuited). Such a transistor 1322, 1326-1330 can never conduct and is superfluous. Similarly, any propagate transistor 1308, 1312 programmed with an input of "1" can be eliminated (or merely short circuited). If a superfluous propagate transistor 1308, 1312 is removed, the source and drain of two functional transistors (e.g., 1308, 1312) can be pushed together, thereby eliminating a wire or extended source/drain connection and reducing capacitive effects on the connection. In FIG. 13, six transistors 1308, 1312, 1322, 1326-1330 can be eliminated using the optimization techniques of this paragraph.

Second, and after performing the first set of optimizations, supra, secondary precharge circuits 1332-1340 can be eliminated wherever two precharge circuits (e.g., 1334, 1336) are now connected to a common circuit node. Secondary precharge circuits 1332-1340 are typically used to stabilize any node to which three or more transistors connect. In FIG. 13, two more transistors 1332, 1336 can be eliminated using this optimization technique.

Third, and also after performing the first set of optimizations, secondary precharge circuits 1332-1340 can be eliminated wherever fewer than three carry chain transistors 1308-1330 are connected to a single circuit node. Two more of the FIG. 13 transistors 1338 1340 can be eliminated using this optimization.

Figure 14:
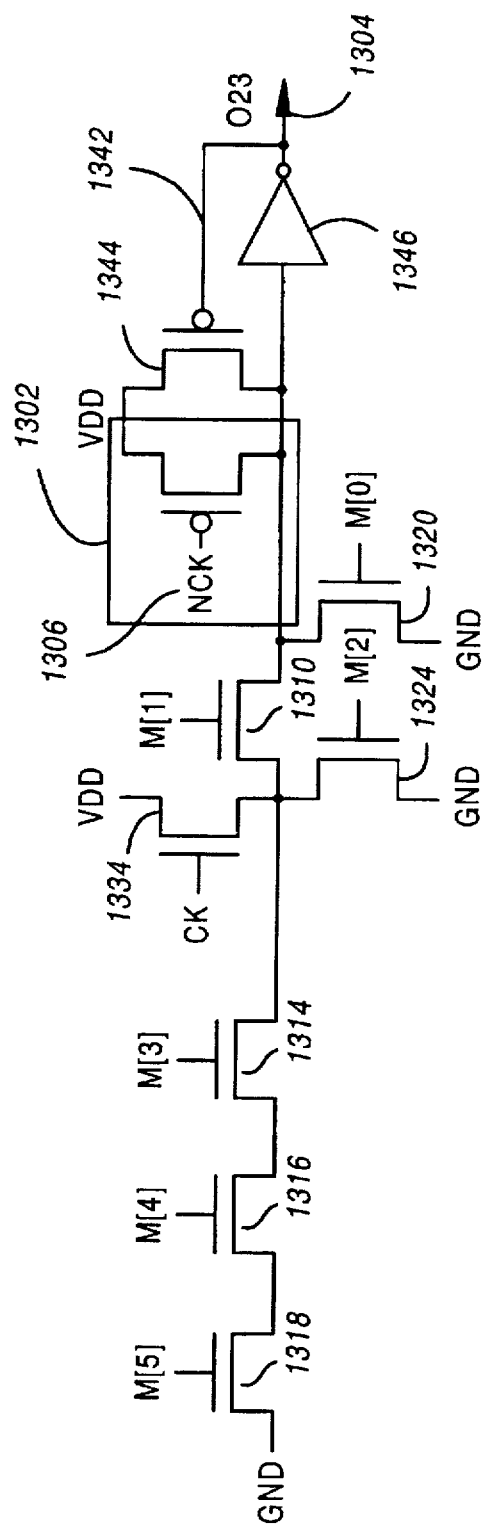
FIG. 14 is a schematic illustrating an optimized version of the FIG. 13 Manchester carry chain.

FIG. 14 shows the circuit 1300 of FIG. 13 after application of all three optimization techniques.

While the FIG. 14 circuit 1400 is fully optimized, and thus very small and fast, its generate and propagate transistors 1310, 1314-1320, 1324 may no longer be programmed to perform comparisons other than C23≦M. As a result, sixty-four uniquely optimized carry chains would be required to implement a sixty-four bit magnitude comparator. To return to a highly modular and repetitive design, without sacrificing the benefits gained through optimization, the circuit of FIG. 14 is best implemented as a multi-part Manchester carry chain, as is shown in FIGS. 15 & 16. Note that the carry chain 1400 has been divided into two components 1500, 1600. The first component 1500 is a four bit component, and the second component 1600 is a two bit component. The two components 1500, 1600 are interconnected at NODE_A 1502. Within a sixty-four bit mask generator, the first component 1500 could therefore be repeated four times, once each in constructing the carry chains corresponding to bits 7, 23, 39 and 55. The second component 1600 could be repeated sixteen times, once each in constructing the magnitude comparing Manchester carry chains corresponding to bits 16 through 31 of the mask word. Alternatively, the carry chain of FIG. 14 could have been broken into components of three bits and three bits, thereby allowing each component to be repeated eight times within a sixty-four bit circuit. While an even break requires the creation of fewer chain pieces (sixteen rather than twenty), the components 1500, 1600 shown provide other advantages which will be described in more detail below.

In order to further increase the speed at which Manchester carry chain magnitude comparators operate, magnitude comparators may also be implemented in dual rail logic. Dual rail logic (also known as vector logic or mousetrap logic) was chosen as the dynamic CMOS logic of choice due to its qualities of being: functionally complete, self-timed, reliable, and very fast. Dual rail logic is described in detail in U.S. Pat. No. 5,208,490 to Yetter entitled "Functionally Complete Family of Self-Timed Dynamic Logic Circuits". This patent is hereby incorporated by reference for all that it discloses.

In brief, a dual rail logic system requires two logic paths (i.e., high and low rail components) to represent a single logic variable. If both rails exhibit a low logic signal, the variable is in an invalid state. If the high rail logic path exhibits a high logic signal, the variable is true. If the low rail logic path exhibits a high logic signal, the variable is false. The case wherein both rails exhibit a high logic signal is undefined, and should be prevented from occurring.

A logic gate of a dual rail system comprises high and low rail components. Each component comprises an arming mechanism (i.e., a precharge circuit), a dynamic CMOS logic block (i.e., a Manchester carry chain), and a buffer mechanism. In operation, the arming mechanisms supply a precharge to their respective buffers (e.g., during a clock low). Incoming logic is operated upon by the dynamic logic blocks and is used to trigger either the high or low rail buffer (e.g., during a clock high). After generating a valid output, the logic gate becomes disabled until the arming mechanisms reset the buffers (e.g., during a subsequent clock low).

Figure 25:
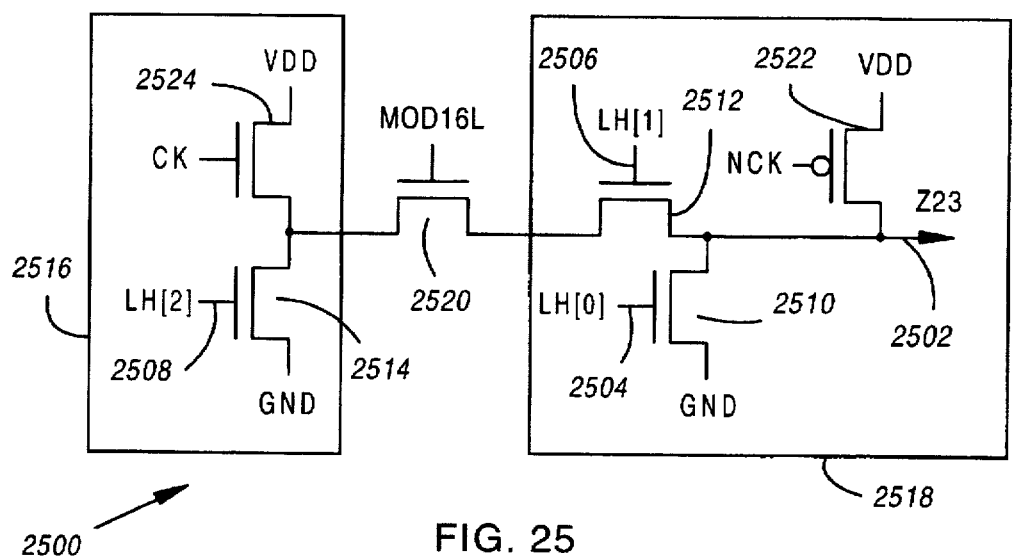
FIG. 25 is a schematic illustrating a Manchester carry chain programmed according to the FIG. 20 table.
Figure 26:
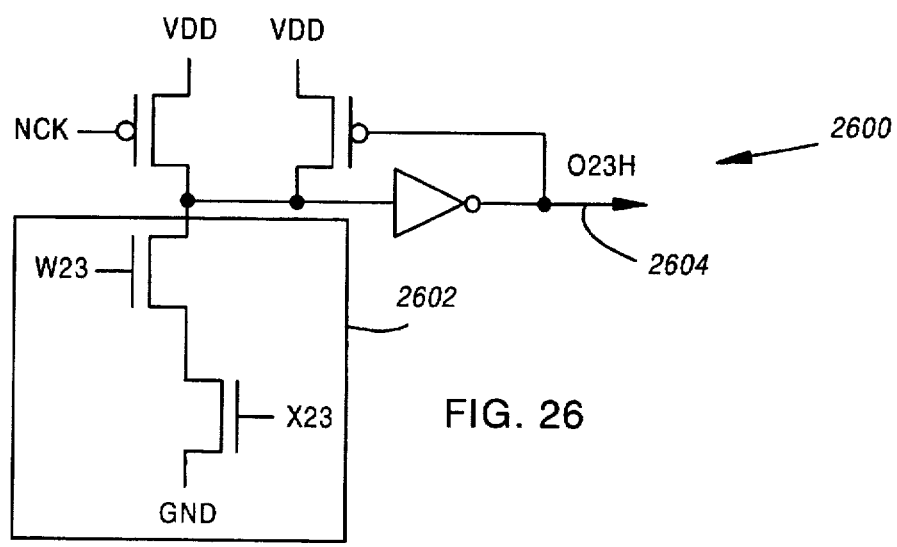
FIG. 26 is a schematic illustrating a dynamic CMOS logic AND circuit.
Figure 27:
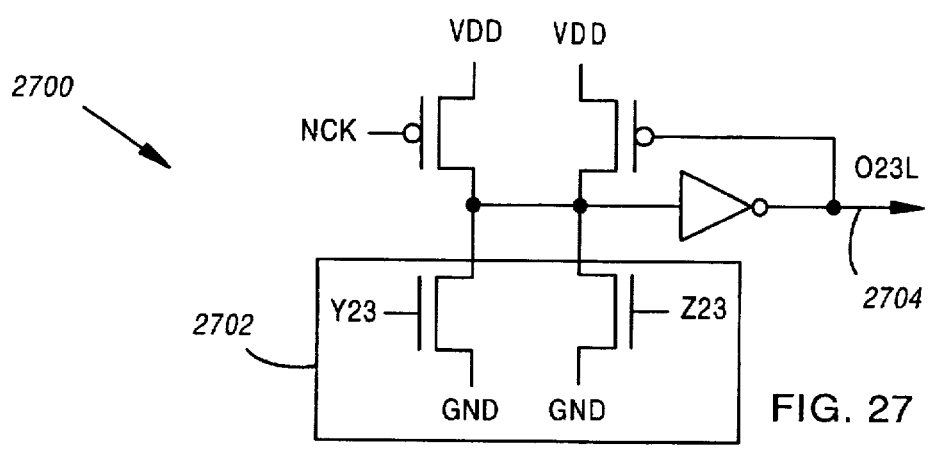
FIG. 27 is a schematic illustrating a dynamic CMOS logic OR circuit.
Figure 28:
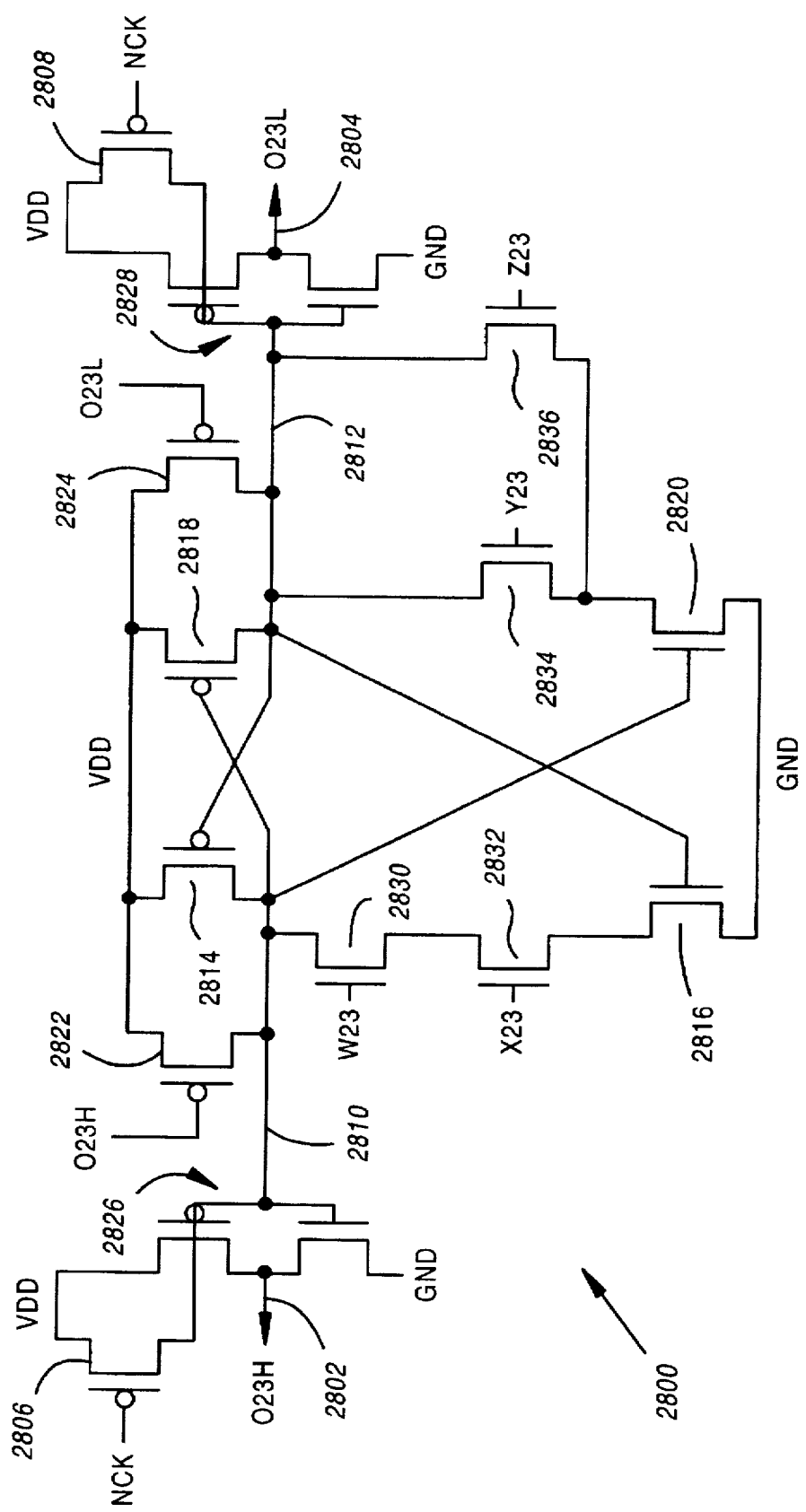
FIG. 28 is a schematic illustrating a dynamic CMOS logic circuit for generating a single dual rail bit of a dual ended mask word.

In addition to being fast, dual rail logic also provides a seamless interface with either dynamic or static logic existing downstream from a magnitude comparator (FIGS. 22-25) or mask generation logic (FIGS. 26-28).

In constructing a dual rail magnitude comparator, high and low rail mask marker components 2902-2908 are required (e.g., MH and ML, LH and LL, or RH and RL). A low rail mask marker component 2902, 2906 may be generated by merely inverting the bits of a high rail mask marker component 2904, 2908.

High and low rail mask conditions are also required. A low rail mask condition is merely the complement of a high rail mask condition. For example, the condition C>RL is the complement of the condition C≦RH.

Given that high and low rail mask markers 2902-2908 and mask conditions have been defined, the tables of FIGS. 5-8 may be easily adapted for use in a dual rail logic environment. Consider a mask (high rail component) obeying the mask conditions $LH \leq C \leq RH$:

i.e., $CO = LH \leq C \cdot C \leq RH$; or $CO = X \cdot W$ (where $X = L \leq HC$ and $W = C \leq RH$).

The low rail component of the mask would therefore obey the mask conditions LL>C and C>RL:

i.e., $CO = LL > C + C > RL$; or $CO = Y + Z$ (where $Z = LL > C$ and $Y = C > RL$).

Given the above mask conditions, the tables of FIGS. 5–8 may be modified to yield the tables of FIGS. 17–20. Note that ~M[I] variables have been replaced with low rail variables, and thus no additional input inversions are needed (input inversions may be required in purely static implementations).

Figure 21:
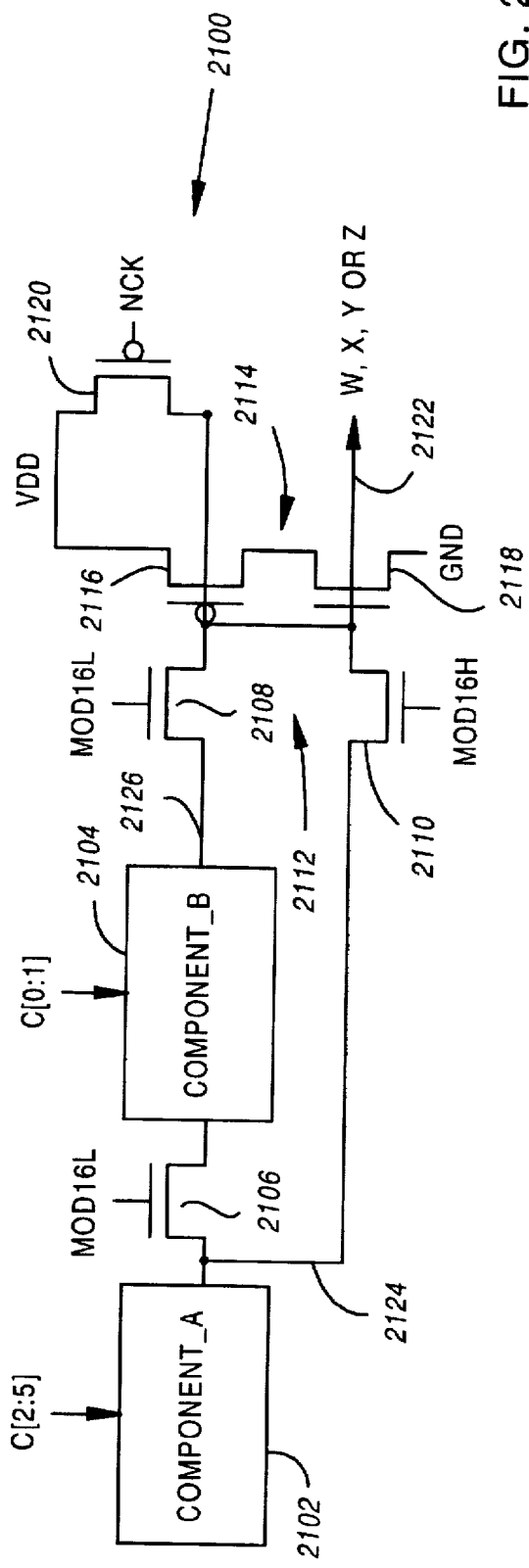
FIG. 21 is a schematic illustrating a framework within which a dual rail Manchester carry chain component can be implemented.

Although the teachings of FIGS. 14–16 could be used to implement the carry chains of a dual rail magnitude comparator, FIG. 21 shows a dynamic CMOS logic circuit 2100 comprising a currently preferred framework for implementing each carry chain 2200, 2300, 2400, 2500 of a sixty-four bit dual rail magnitude comparator. Each carry chain 2200, 2300, 2400, 2500 is once again divided into two components (i.e., COMPONENT_A 2102 and COMPONENT_B 2104) as in FIGS. 15 & 16 However, the two components 2102, 2104 are linked by a transfer FET 2106 driven by the input MOD16L MOD16 is a dual rail mode variable which gives a magnitude comparator the ability to generate a mask 2900 for either a single large word or a plurality of smaller words. In FIG. 21, MOD16 is configured so as to allow generation of either a single sixty-four bit mask, or four sixteen bit masks. When MOD16H carries a high logic signal, the generation of four sixteen bit masks is enabled and the transfer FET 2106 driven by MOD16L is disabled. When MOD16L carries a high logic signal, the generation of a single sixty-four bit mask is enabled, and the transfer FET 2106 connecting COMPONENT_A 2102 and COMPONENT_B 2104 is enabled, thereby completing a full N bit carry chain. The parallel NFETS 2108, 2110 of FIG. 21 driven by variables MOD16H and MOD16L operate as a multiplexor 2112 transferring the output 2124, 2126 of either a four or six bit carry chain to the inputs of a pipelatch 2114 capable of storing a Manchester carry chain's output. The multiplexor's output is precharged by a suitable precharging mechanism 2120. The pipelatch 2114 may comprise a powered PFET 2116 connected in series with a grounded NFET 2118. Depending upon the comparison being made by a carry chain 2102, 2104, the output 2122 of the FIG. 21 circuit 2100 might be either a W, X, Y or Z quantity. The MOD16 mode variable is extremely useful in processing multimedia data, such as JPEG, MPEG and other sixteen bit data which is frequently carried within the confines of a single doubleword. [NOTE: In a thirty-two bit system, a single doubleword comprises sixty-four bits.]

Figure 22:
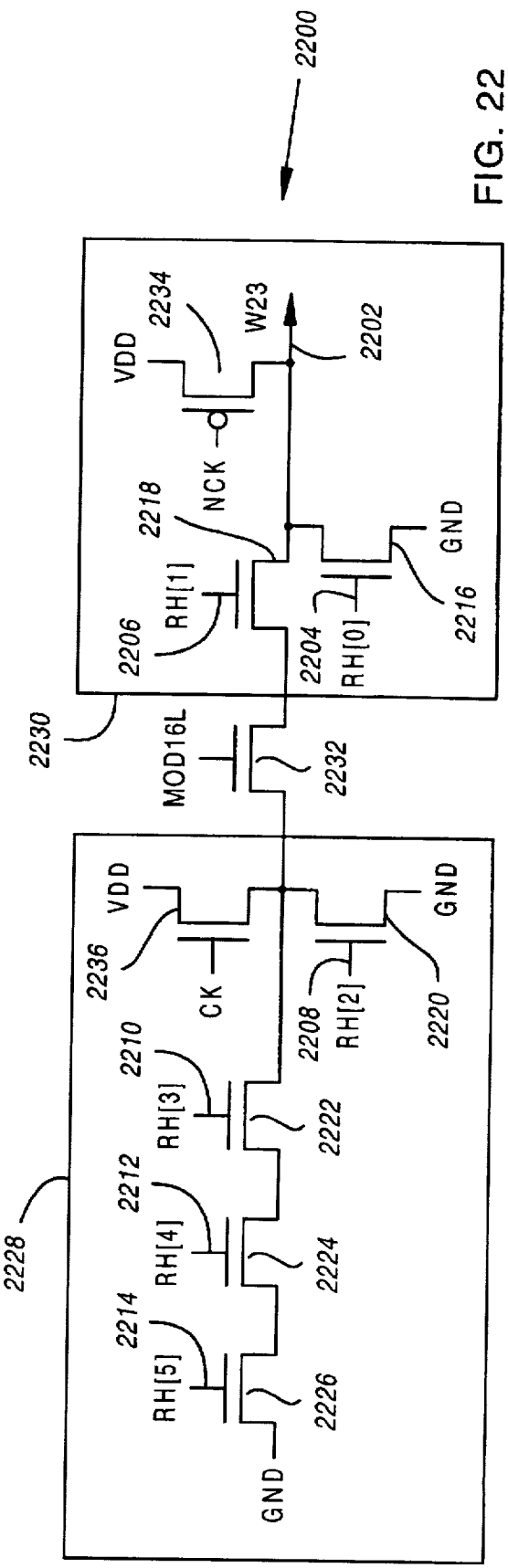
FIG. 22 is a schematic illustrating a Manchester carry chain programmed according to the FIG. 17 table.

FIG. 22 illustrates an exemplary dual rail circuit 2200 for implementing the comparison $C23 \leq RH = W23$. The circuit 2200 comprises generate and propagate transistors 2216–2226 programmed in accordance with the FIG. 17 table 1700. The circuit 2200 is broken into two components 2228, 2230 which correspond to the components 2102, 2104 of FIG. 21. Also consistent with the circuit 2100 of FIG. 21, the two components 2228, 2230 are interconnected with a transfer FET 2232. Note that due to the small size of dual rail logic FETS 2216–2226, all of the circuit's secondary prechargers 2236 may be implemented with NFETS, which on average are smaller than PFETS. If NFETS are used to implement both logic 2216–2226 and precharging circuits 2236, source nodes can be shared and wells (i.e., separations between NFETS and PFETS) are not needed. This further reduces the die surface area required to implement a circuit. However, while secondary prechargers 2236 are particularly suited for NFET implementations, primary prechargers 2234 may be implemented with PFETS with little penalty. Since each primary precharger 2234 is in close proximity to a buffer 2114 comprising a PFET 2116, a well already exists, and there is little penalty which results from implementing a primary precharger as a PFET 2234.

FIG. 23 shows a circuit 2300 which implements the comparison $LH \leq C23 = X23$. Again, it is divided into two components 2316, 2318 connected by a transfer FET 2320. However, note that although the circuit 2300 is used in generating the high rail component of a dual rail mask, it comprises low rail inputs 2304–2308. Since LH bits would have to be inverted prior to being input into the circuit (see FIG. 6), the use of LL inputs 2304–2308 eliminates the necessity of an inversion stage preceding the circuit 2300. As with other dual rail circuits 2200, 2300, 2400, 2500 disclosed herein, secondary precharging circuits need only comprise smaller NFETS 2236, 2324–2326, 2434–2438, 2524. Primary precharging circuits may also comprise NFETS, but as earlier stated may also, with the addition of very little penalty, comprise PFETS 2234, 2322, 2432, 2522. At first glance, the first component 2316 of the FIG. 23 circuit 2300 seems to be missing a number of generate transistors programmed with LL[3], LL[4] and LL[5] inputs. These transistors have been optimized away since they would merely be shorted by a continuous string of propagate transistors programmed with logic "1" inputs.

FIGS. 24 and 25 illustrate circuits 2400, 2500 which implement the comparisons $C > RL = Z23$ and $LL > C = Y23$ in accordance with the programming tables 2000, 1900 of FIGS. 20 and 19, respectively. The circuits each comprise two components 2428, 2430, 2516, 2518 connected by a transfer FET 2440, 2520 and are similar in many respects to the dual rail Manchester carry chains 2200, 2300 already described. The circuit 2500 of FIG. 25 is missing additional propagate transistors programmed by inputs LH[3] and LH[4]. These transistors are unnecessary given that they would comprise an electrical path which would be permanently open-circuited by a P[5] propagate transistor programmed with a grounded input (since equivalence does not enter into the implemented comparison).

As comparisons are completed in the Manchester carry chain stages 2100, the carry chain outputs 2122 (i.e., W, X, Y and Z) must be logically combined in order to generate the appropriate mask bits of a high and low rail mask. FIG. 26 shows a circuit 2600 for logically ANDing W and X terms to create a field of "1"s in a string of "0"s (e.g., a high rail mask component). Likewise, FIG. 27 shows a circuit 2700 for logically ORing Y and Z terms to create field of "0"s in a string of "1"s (e.g., a low rail mask component). Note that the circuits 2600, 2700 of FIGS. 26 & 27 have complementary dynamic CMOS logic blocks 2602, 2702. As a result, only one of the O23H and O23L outputs 2604 2704 will be pulled high at any given instant. These circuits are more fully described in Yetter's "Functionally Complete Family of Self-Timed Dynamic Logic Circuits" patent.

FIG. 28 illustrates a more complex circuit 2800 for generating a dual rail output bit 2802, 2804 (i.e., O23H and O23L). The circuit 2800 comprises prechargers 2806, 2808 which enable each output 2802, 2804 to be held low 1) during a precharge cycle of clock NCK and/or 2) until valid data is received at the circuit's W23, X23, Y23 and Z23 inputs. [Note that CK and NCK, as used throughout this description, are presumed to be binary clocks alternating between a clock high (e.g., a voltage of value VDD) and a clock low (e.g., ground or GND).] When valid data drives appropriate transistors 2830–2836 and pulls a precharged node 2810, 2812 low, output disabling devices 2814–2820 comprising a powered PFET and grounded NFET crosscoupled to the triggered precharge node 2810, 2812 help to disable the untriggered node 2812, 2810 so that it cannot be simultaneously pulled low by voltage spikes, noise or the like. In other words, the FIG. 28 circuit 2800 can only be triggered once following a precharge cycle of clock NCK. Additional PFETS 2822, 2824 couple the outputs 2802, 2804 of the circuit's inverting buffer mechanisms 2826, 2828 with their respective precharge nodes 2810, 2812 so as to provide a feedback path ensuring that outputs 2802, 2804 remain true and do not degrade over time.

A dual rail magnitude comparator comprising optimized Manchester carry chains 2200, 2300, 2400, 2500 as described reduces the load on mask marker bits 2902–2908 driving the carry chain generate and propagate transistors 2216–2226, 2310–2314, 2416–2426, 2510–2514. In a sixty-four bit magnitude comparator, each mask marker bit 2902–2908 drives sixty-four transistor gates, thirty-two of which are generate transistor gates and thirty-two of which are propagate transistor gates. This even fanout allows the use of a single driver type in conjunction with all mask marker bits. Although faster than a static CMOS implementation, an optimized single rail dynamic CMOS implementation of a Manchester carry chain magnitude comparator does not provide an even fanout from the mask marker bits 2902–2908. As a result, different size drivers are needed to drive different mask marker bit values and signal skew is inevitable.

A dual rail magnitude comparator also eliminates the need for an inverter stage prior to inputting mask marker bits 2902–2908 into a Manchester carry chain 2200, 2300, 2400, 2500, and subsequent to the generation of a mask word 2900. Inversion stages slow down the flow of data and require more die surface area on an integrated circuit (IC) wafer.

Dual rail logic not only increases the speed of mask generation (because it is self-timed), but also contributes to a significant reduction in the number of required transistors. At first glance, it would appear that a dual rail implementation requires more die surface area for implementation, but this is not the case. The surface area of an IC occupied by magnitude comparators and mask generation logic is largely determined by the wire routings of mask marker bits 2902–2908, and not by the transistors comprising the magnitude comparators. The equal fanout and reduced loading of mask marker bits 2902–2908 allows smaller mask marker drivers to be used. This, in conjunction with 1) parasitic capacitance reduction through optimization techniques, 2) the fact that precharged nodes are easier to pull down, and 3) the fact that dual rail logic systems are self-timed, allows smaller NFETS to be used in constructing a carry chain 2200, 2300, 2400, 2500. In fact, due to the inversion stages required within a single rail logic implementation, the number of transistors 2216–2226, 2234, 2236, 2310–2314, 2322–2326, 2404–2414, 2432–2436, 2510–2514, 2522, 2524 required to implement all of the Manchester carry chains 2200, 2300, 2400, 2500 corresponding to a single mask bit (or high and low components of a mask bit) falls from seventy-six to twenty-nine. Dual rail logic is therefore particularly suited for the generation of masks.

Using the teachings disclosed herein, single rail mask generation logic has generated a mask word in 1.2–1.4 ns, and dual rail mask generation logic has generated a mask word in 700–800 ps.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method of generating a mask word of up to $2^N$ mask bits, wherein each mask bit is referenced by a position marker of N bits, the method comprising the steps of:

a) generating a number of N bit mask markers;

b) defining a number of mask conditions in terms of the mask markers and position markers;

c) performing a plurality of mask marker and position marker comparisons in parallel, thereby determining whether particular mask conditions are true with respect to a particular mask marker and particular position marker; and d) setting or clearing mask bits of the mask word based on the truth of the plurality of mask marker and position marker comparisons.

2. A method as in claim 1, wherein the steps of performing a plurality of mask marker and position marker comparisons, and setting or clearing mask bits of the mask word, comprise the steps of:

a) constructing and programming a plurality of Manchester carry chains to perform the comparisons; and b) if a predetermined number of comparisons made between a particular subset of mask markers and a particular position marker determine that a particular subset of mask conditions are true with respect to the particular subset of mask markers and particular position marker, identifying the mask bit referenced by the particular position marker as being within a mask field.

3. A method as in claim 2, wherein the step of programming a Manchester carry chain comprises wiring inputs of the Manchester carry chain to bits of a particular mask marker.

4. A method as in claim 2, wherein the steps of constructing and programming a Manchester carry chain comprise:

a) chaining together a number of generate and propagate transistors having inputs wired to bits of a particular mask marker; and b) ensuring that no transistors of the Manchester carry chain comprise an electrically shorted or opened path.

5. A method as in claim 2, wherein the mask bits of the mask word are dual rail mask bits, and wherein:

a) the step of generating a number of N bit mask markers comprises generating a number of dual rail N bit mask markers;

b) the step of defining a number of mask conditions comprises defining a number of complementary mask conditions;

c) the step of performing a plurality of mask marker and position marker comparisons comprises performing comparisons between particular position markers and particular mask marker rails; and d) the step of setting or clearing mask bits of the mask word comprises setting dual rail mask bits.

6. A method as in claim 5, wherein:

a) the step of generating a number of N bit dual rail mask markers comprises generating exactly two N bit dual rail mask markers; and b) the step of defining a number of mask conditions comprises defining four mask conditions divided into two complementary sets.

7. A method as in claim 2, wherein:

a) the step of generating a number of N bit mask markers comprises generating exactly two N bit mask markers.

8. A method as in claim 2, wherein:
a) the step of constructing a single Manchester carry chain comprises:
   i) laying out the single Manchester carry chain in two chain components;
   ii) controlling the interconnection of the two chain components with a transfer FET; and
   iii) multiplexing an output of each of the two chain components, thereby enabling generation of a single mask of up to $2^N$ bits, or M masks of up to $2^N/M$ bits each.

9. A method as in claim 2, wherein:
a) the step of constructing a single Manchester carry chain comprises:
   i) laying out the single Manchester carry chain in two interconnected chain components; and
   ii) multiplexing an output of each of the two chain components, thereby enabling generation of a single mask of up to $2^N$ bits, or M masks of up to $2^N/M$ bits each.

10. Apparatus comprising a plurality of Manchester carry chains coupled so as to substantially simultaneously effect the comparison of a number of N bit mask markers with up to $2^N$ N bit position markers, thereby generating a mask word of up to $2^N$ mask bits.

11. Apparatus as in claim 10, wherein each of the Manchester carry chains comprises a number of generate and propagate transistors having inputs wired to the bits of a particular mask marker.

12. Apparatus as in claim 10, wherein:
a) each of the Manchester carry chains comprises two chain components;
b) the two chain components of a single Manchester carry chain are switchably interconnected by a transfer FET; and
c) receiving outputs from each of two switchably interconnected chain components is a multiplexor for selecting and outputting to a bit position of the mask word the output of one of the chain components, thereby enabling the generation of a single mask of up to $2^N$ bits, or M masks of up to $2^N/M$ bits each.

13. Apparatus as in claim 10, wherein:
a) each of the Manchester carry chains comprises two interconnected chain components; and
b) receiving outputs from two interconnected chain components is a multiplexor for selecting and outputting the output of one of the chain components, thereby enabling the generation of a single mask of up to $2^N$ bits, or M masks of up to $2^N/M$ bits each.

14. Apparatus as in claim 10, wherein each of the plurality of Manchester carry chains comprises one or more modular chain components having inputs which are programmed to receive various bits of one of the number of N bit mask markers.

15. Apparatus as in claim 14, wherein each of the plurality of Manchester carry chains comprises two modular chain components.

16. Apparatus for generating a mask word of up to $2^N$ mask bits, comprising:
a) a plurality of Manchester carry chains, each Manchester carry chain comprising,
   i) inputs driven by bits of a particular one of a number of mask markers;
   ii) a chain of generate/propagate transistor stages, interconnected with said inputs, configured to perform a comparison between a particular mask marker and particular position marker; and
   iii) an output, derived from said chain of generate/propagate transistor stages, indicative of a mask condition's truth with respect to the particular one of the number of mask markers and a particular position marker which identifies one of the $2^N$ mask bits; and
b) mask generation logic coupling the outputs of the plurality of Manchester carry chains to bits of the mask word.

17. Apparatus as in claim 16, wherein the plurality of Manchester carry chains and mask generation logic are implemented in dynamic CMOS logic.

18. Apparatus as in claim 16, wherein:
a) each chain of generate/propagate transistor stages is broken into two or more modular chain components; and
b) said modular chain components are repeated within various of said plurality of Manchester carry chains.

19. Apparatus as in claim 18, wherein each chain of generate/propagate transistor stages is broken into two modular chain components, and the two modular chain components are interconnected via a transistor switch.

20. Apparatus as in claim 18, wherein:
a) the mask generation logic comprises a plurality of multiplexors corresponding to the plurality of Manchester carry chains; and
b) outputs of each two or more modular chain components comprising a single Manchester carry chain are received by one of the plurality of multiplexors.

* * * * *